Oct. 24, 1950     G. C. VON BECK     2,526,981
DEVICE FOR SUPPORTING FISHING RODS
Filed Nov. 1, 1947
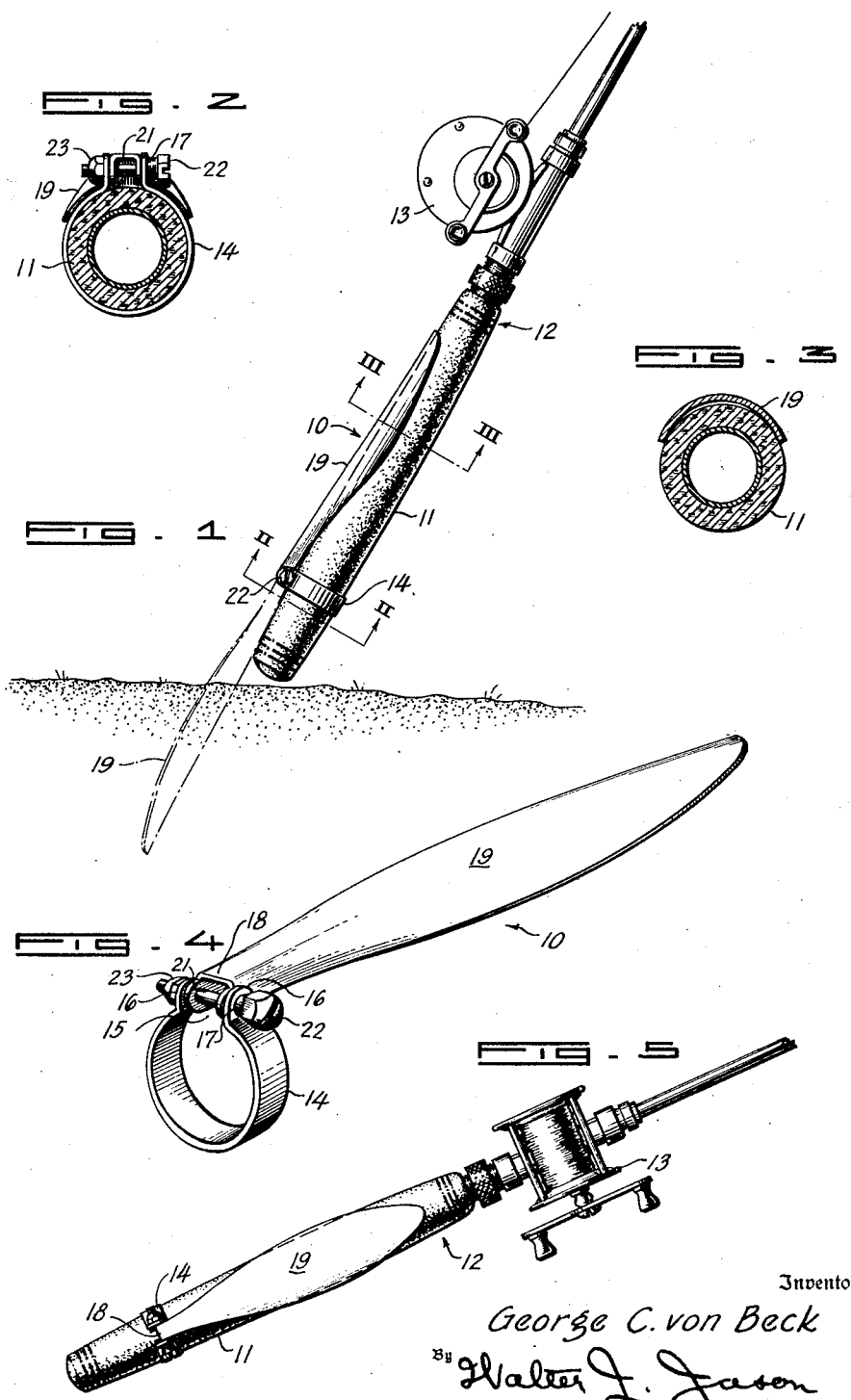
Inventor
George C. von Beck
By Walter J. Jason
Attorney Patented Oct. 24, 1950

2,526,981

UNITED STATES PATENT OFFICE 2,526,981

DEVICE FOR SUPPORTING FISHING RODS

George C. von Beck, San Diego, Calif.

Application November 1, 1947, Serial No. 783,515

3 Claims. (Cl. 248—38)

This invention relates to improvements in surf fishing equipment and more particularly to a device adapted to permit a surf casting rod to be maintained in a predetermined position in the sand of the beach after the bait has been cast into the surf. Such devices are generally known as sand spikes and by their use a fisherman is enabled to leave a rod unattended and to fish a plurality of rods at the same time.

In the past, sand spikes have been developed for use with casting rods which consisted of simply a conventional spike having mounted on its upper end a cylindrical container or socket into which the butt end of the rod was deposited after the spike was driven in the sand.

Such prior art devices as that described above have inherent weaknesses which mitigated against their efficient utilization by the fisherman. In the first place, the size of the cup must be such that it is adapted to receive widely varying sizes of rod butts which, because they consequently cannot be securely retained in the cup, have a tendency to be pulled therefrom when a fish strikes at the bait. In addition, the play of the rod butt in the cup and its consequent movement therein permits the spike to be worked loose from the sand, eventually causing the rod and cup to fall to the ground and permitting the rod to be dragged along the beach when a strike is made.

Further, the size and shape of prior art sand spikes makes them difficult to transport and a problem to store and the usual result is that they cannot be kept with the rod as is most desirable.

The sand spike which is the subject of the present invention has, by its construction and design, eliminated most of the problems encountered in prior art sand spikes. It is designed to fit a wide range of rod butts but despite its universality its grip upon the butt is always a secure one and prevents the movement and shifting of the rod.

Unlike conventional sand spikes which utilize regular spikes to secure a purchase in the sand the present invention has incorporated therein a uniquely designed spoon-shaped member which is adapted to be driven into the ground and which can resist more effectively the loads placed upon it when a fish strikes the line.

Another feature of the present invention lies in the fact that it can be permanently, though removably, mounted upon the butt of the rod. With this feature all problems of transportation and storage of the device are readily solved.

The spood-shaped sand engaging member of the present invention is designed to be retracted from its working position and to be actuated into a position where it lies flush against the surface of the butt of the rod whereupon the rod can be readily used in the conventional manner, the sand spike mounted thereupon affording no inconvenience or hindrance.

It is one object, therefore, of the present invention to provide a sand spike for fishing rods which is universal in nature and which can, nevertheless, be tightly secured by frictional engagement to the butt of the rod with which it is utilized.

Another object of the present invention is the provision of a sand spike having a unique spoon-shaped spike member which is adapted to effectively resist the tendency of the rod to be pulled from the sand when a strike is made, and which remains mounted on the rod when the fisherman is handling the rod on a strike.

An additional object of the present invention is the provision of a sand spike which is adapted to be permanently, though removably, mounted on the rod with which it is utilized.

A further object of the present invention is the provision of a sand spike which possesses a minimum number of working parts and which can be easily and cheaply manufactured.

Other objects and advantages of the present invention will be made readily apparent to those skilled in the art by a perusal of the appended specification and accompanying drawing, in which:

Figure 1 is a side elevational view of a rod having a sand spike constructed in accordance with the present invention mounted thereupon; and illustrating in phantom the position assumed by the sand spike when inserted into sand;

Figure 2 is a sectional view taken on line II—II of Figure 1 showing one means of securing the sand spike to the butt of the rod;

Figure 3 is a detail sectional view taken on ilne III—III of Figure 1 showing the manner in which the shape of the spike of the sand spike permits it to fit snugly against the surface of the butt of the rod;

Figure 4 is a perspective showing of the subject invention; and

Figure 5 is a plan view showing the manner in which the present invention is applied to the rod.

As shown in the drawings, the sand spike 10, which is the subject of the present invention, is secured in operative position to the butt end 11 of a surf casting rod 12. Mounted on the surf casting rod 12 above the butt end 11 is a reel 13 of conventional design. The sand spike 10 is always mounted on that side of the butt end 11 of rod 12 that the reel 13 lies so that the reel will be in position for playing or reeling in the fish when the rod 12 is pulled out of the sand by the fisherman.

The sand spike 10 utilizes a substantially circular band or mounting means 14 which is bifurcated as at 15 to maintain it upon the rod butt 11. The oppositely disposed ends of the mounting means 14 are formed into upstanding ears 16 which have drilled, stamped or otherwise created therein holes 17. It is intended that the mounting means 14 be formed of resilient metal or similar material so that it is adapted to be fastened to rods of different circumference.

Inserted between the upstanding ears 16 of the mounting means 14 is an end 18 of a substantially spoon-shaped, elongated, concave spike or sand penetrating means 19. A cross-section taken through the center of spike 19 (as illustrated in Figure 3) reveals it as being substantially concave in that region. As it tapers to a point the concavity flattens out to permit the more ready penetration of the sand by the point. It is, of course, not intended that the spike be limited to the specific shape shown in the drawings since it is conceivable that variations may be made therein. The spike is preferably formed of stainless steel or other non-corrosive material to resist the corrosive effect of salt air.

The lower end 18 of the spike 19 is formed into a three-sided section (as best shown in Figure 2) which is adapted to fit between the upstanding ears 16 of mounting member 14 and which has holes 21 formed therein juxtaposed to holes 17 in the upstanding ears 16. A mounting bolt 22 is inserted through holes 17 in the upstanding ears 16 of mounting member 14 and holes 21 in the lower end 18 of spoon-shaped spike 19. The spike 19 is adapted to rotate upon the shank of bolt 22 which lies between the upstanding ears 16 of mounting member 14. Since nut 23 is threadedly maintained upon the projecting end of bolt 22 it serves both to prevent the dislocation of bolt 22 and to tighten the ears 16 of mounting member 14 against the sides of the lower end 18 of spoon-shaped spike member 19.

When the sand spike 10 is to be mounted upon the butt end 11 of rod 12 the nut 23 is unthreaded on the bolt 22 permitting the ears 16 to be spread and expanding the circumference of mounting means 14. The butt end 11 of rod 12 is then inserted into the mounting means 14 and the mounting means is so located upon the butt 11 that space for a hand-hold on the butt 11 below the mounting means 14 is provided. The nut 23 is then tightened and the ears 16 are drawn into contact with the rectangular sides of end 18 of spoon shaped spike 19. The tightening of the fastening assembly or means which, of course, could conceivably be some mechanical expedient other than a conventional bolt and nut, causes the mounting member 14 to grip upon the periphery of the butt end 11 of rod 12 and secures the sand spike thereupon. There is thus obtained a secure, frictional grip upon the butt of the rod which cannot be inadvertently loosened but which, nevertheless, will in no way mar or abrade the surface of the butt. The tightness with which the fastening means is adjusted also regulates the freedom with which the spoon-shaped spike 19 will rotate upon the shank of bolt 22. Since it is desired that, when not in use, the spoon-shaped spike 19 nest against the butt end 11 of the rod 12 when not in use the tension afforded by the fastening means is adjusted to prevent the spike 19 from flopping down when in the retracted position.

Should a rod having a butt end of rather larger dimensions than ordinary be utilized in conjunction with the present invention and should the mounting member 14 not be of sufficient size to abut the ears 16 of mounting member 14, shims may be inserted upon the shank of bolt 22 between the rectangular sides of end 18 of spoon-shaped spike 19 and the ears 16 thus permitting the expansion of the mounting member 14 to accommodate the larger butt.

When the spoon-shaped spike portion 19 of the sand spike 10 is in its extended position and driven into the sand the lower end of the butt end 11 of rod 12 biases or rests against the back of the spoon-shaped spike 19 and continually prevents the spoon-shaped spike 19 from collapsing against the butt. The weight of the rod 12 and the reel 13 acts to force the butt 11 of the rod 12 against the back of the spike 19 and tends to keep it in the extended position.

The concavity of the spoon-shaped spike 19 presents a larger frontal area to the sand which surrounds it than conventionally shaped spikes and thus it more effectively resists dislodgment once it is embedded in the sand. Further, the concavity tends to exercise a scoop action on the sand in which it is embedded and wedges more tightly in the sand as the load on the rod is increased.

When the concave spike 19 is rotated against the butt end 11 of rod 12 its conformation permits it to be nested against the periphery of the butt 11 and facilitates the handling of the rod when the sand spike 10 is left upon the rod while the rod is in use. Because of this nesting feature it is not necessary to remove the sand spike when casting and the utilization of the sand spike is thus rendered easier and simpler because immediately upon casting the concave spike can be extended and driven into the sand.

There is thus provided by this invention, a sand spike which is adapted to be securely but removably mounted upon a rod, which is designed to retract into a substantially flush position against the butt of the rod and which embodies a minimum number of parts thereby adapting it for inexpensive and economical fabrication.

It is obvious that the embodiment of the present invention described in the above specification and shown in the accompanying drawing has been described and shown for the purpose of explaining the manner of construction and mode of operation of the invention and it is not intended to limit the invention to the details of the particular embodiment, as many variations will be readily apparent to those skilled in the art and the invention is to be given its broadest possible interpretation within the terms of the following claims.

I claim:

1. A holding device for a fishing rod having a reel provided thereon for maintaining the fishing rod in a substantially erect position comprising an elongated spike means having one face thereof concave, a substantially circular mounting member formed of resilient material, and fastening means for pivotally connecting said spike means to said mounting member upon the fishing rod on the same side thereof as the fishing reel whereby it can be rotated from a retracted nested position on the fishing rod to an operative position wherein it extends beyond the end of the fishing rod.

2. A holding device for a fishing rod having a reel supported thereon, comprising an elongated spike means having one face thereof concave, a substantially circular bifurcated mounting means formed of resilient material and adapted to be secured to said fishing rod, and fastening means for pivotally connecting one end of said spike means to said mounting means to position the spike means upon the fishing rod on the same side thereof as the fishing reel whereby the spike means may be rotated from an inoperative position flush against the periphery of the fishing rod to an extended position where it may support the fishing rod in a substantially erect position.

3. A holding device for a fishing rod having a reel mounted thereon, comprising an elongated spike means having one face thereof concave for nesting with said fishing rod, a substantially circular, bifurcated, resilient mounting member having upstanding, oppositely disposed, ear portions formed thereon with aligned openings provided in said ear portions, and fastening means positioned in said openings adapted to clamp said mounting member to said fishing rod with said ear portions located on the same side of the fishing rod as is the reel and to pivotally connect one end of said spike means to said mounting member whereby said spike means when in retracted and nested position will lie wholly on the fishing rod and be directed toward the reel, and will be adapted to rotate on the fastening means away from the fishing reel to extend beyond the end of the fishing rod to assume an operative position for maintaining the fishing rod in a substantially erect position.

GEORGE C. von BECK.

REFERENCES CITED

The following references are of record in the file of this patent:

UNITED STATES PATENTS

| Number | Name | Date |
|---|---|---|
| 1,566,232 | Schreiter | Dec. 15, 1925 |
| 1,873,615 | McIntosh | Aug. 23, 1932 |
| 2,204,692 | Parisio | June 18, 1940 |